(12) United States Patent
Torun et al.

(10) Patent No.: US 8,239,968 B2
(45) Date of Patent: Aug. 7, 2012

(54) ATHERMAL ATOMIC FORCE MICROSCOPE PROBES

(75) Inventors: Hamdi Torun, Atlanta, GA (US); Fahrettin L. Degertekin, Atlanta, GA (US); Ofer Finkler, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 187 days.

(21) Appl. No.: 12/830,989

(22) Filed: Jul. 6, 2010

(65) Prior Publication Data

US 2011/0055986 A1 Mar. 3, 2011

Related U.S. Application Data

(60) Provisional application No. 61/223,157, filed on Jul. 6, 2009.

(51) Int. Cl.
*G01N 13/16* (2006.01)
*G01N 13/00* (2006.01)
*G01Q 60/24* (2010.01)

(52) U.S. Cl. ............... 850/33; 850/40; 850/1; 850/5; 850/13

(58) Field of Classification Search .................. 850/33, 850/40, 1, 5, 13
See application file for complete search history.

(56) References Cited

U.S. PATENT DOCUMENTS

| 5,494,829 A * | 2/1996 | Sandstrom et al. | 436/518 |
| 5,541,057 A * | 7/1996 | Bogart et al. | 435/5 |
| 5,552,272 A * | 9/1996 | Bogart | 435/6.12 |

* cited by examiner

*Primary Examiner* — Nikita Wells
(74) *Attorney, Agent, or Firm* — Bryan W. Bockhop; Bockhop & Associates, LLC

(57) ABSTRACT

An atomic force microscopy system includes an imaging probe having a first thermal displacement constant and a sample placement surface. At least a portion of the sample placement surface has a second thermal displacement constant. The sample placement surface is spaced apart from the imaging probe at a predetermined displacement. The sample placement surface is configured so that the second thermal displacement constant matches the first thermal displacement constant so that when the imaging probe and the sample placement surface are subject to a predetermined temperature, both the portion of the sample placement surface and the imaging prove are displaced by a same distance.

10 Claims, 7 Drawing Sheets

ATHERMAL ATOMIC FORCE MICROSCOPE PROBES

CROSS-REFERENCE TO RELATED APPLICATION(S)

This application claims the benefit of U.S. Provisional Patent Application Ser. No. 61/223,157, filed Jul. 6, 2009, the entirety of which is hereby incorporated herein by reference.

This application is related to U.S. patent application Ser. No. 11/260,238, filed Oct. 28, 2005, which is a non-provisional of Ser. No. 60/691,972, filed Jun. 17, 2005, the entirety of each of which is hereby incorporated herein by reference.

STATEMENT OF GOVERNMENT INTEREST

This invention was made with government support under contract No. IR01AI060799-01A2, awarded by the National Institutes of Health. The government has certain rights in the invention.

BACKGROUND OF THE INVENTION

1. Field of the Invention

The present invention relates to atomic force microscopy systems and, more specifically, to an atomic force microscopy system that compensates for variations in temperature.

2. Description of the Related Art

Atomic force microscopy (AFM) is used to image and otherwise characterize materials at the atomic scale. A typical AFM device includes a cantilever probe or membrane probe that interacts with the material being imaged. Light reflected from the cantilever or membrane is measured either by sensing displacement of the light beam or by interferometry to determine how the probe has interacted with the material.

AFM has been used extensively to probe the nanoscale interactions that take place in wide range of time scales, from microseconds to minutes. Long time scale experiments require stability and control of drift to minimize the effects of changes in ambient conditions. Thermal drift of the cantilever due to ambient temperature changes is a significant source of drift in AFM systems along with mechanical vibrations, material creep, and surface stress changes.

The AFM cantilever is usually a bimorph structure and is sensitive to temperature changes. It can even be used as a thermal detector. In contrast, the deflection of the cantilever due to changes in ambient temperature is detrimental for AFM especially for long time-scale experiments where the rate of drift is comparable with the rate of measured interactions. Thermal drift can be corrected using correlation methods and Kalman filtering for imaging purposes, but a different approach is needed to address this problem for force spectroscopy experiments involving biomolecules or cells. The effect of Thermal drift in these experiments is two-fold: a) the cantilever bends, which can cause a false force reading; and b) the zero-force level shifts. These cannot be tolerated in biomolecular experiments where the samples are delicate and the precise control of both force and tip-to-sample distance is critical. Thus, effective methods for reducing thermal drift in AFM are needed to probe slow biomolecular interactions.

One method reduces thermal drift by simply removing the metal layer over the base of the cantilever. The end of the cantilever, where the deflection is read, still has the metal layer so these cantilevers are still exposed to thermally induced deflection. Instead of modifying the existing cantilevers, one method uses a force sensing structure to effectively reduce the probe dependent thermal. In addition to the efforts for reducing the thermal drift with modified and new probes, researchers have also developed new techniques for existing cantilevers. One method employs a software routine where the cantilever is time-shared between the sample and the substrate for referencing. When the cantilever should be engaged on the sample for the entire experiment, the referencing can be done by reading the deflection of a reference sensor. The reference sensor, which provides distance information from the cantilever substrate-to-sample can simply be another cantilever next to the measurement one, an interferometer, or an electrostatic sensor. Suppression of drift has been demonstrated with these methods which require a feedback controller to keep the force constant. The reference sensor provides information for compensation of drift in distance from cantilever plane to sample substrate. However, this approach may not prevent cantilever bending against a stationary surface while the cantilever is connected to the surface through a biomolecule or a cell.

Thermal drift in AFM systems due to changes in ambient temperature can be a significant source of inaccuracies in AFM measurements. An AFM cantilever is usually a bimorph structure that is sensitive to ambient temperature changes. Such sensitivity can be detrimental in AFM imaging, especially for long term time-scale experiments where the rate of drift may be comparable with the rate of interactions being measured.

In some applications, such as imaging, one can compensate for thermal drift using correlation and filtering. But such compensation schemes may not work well in characterizing biomolecules and cells. This is because these methods do not reduce the additional force generated by the probe resulting from thermal drift. The added force exerted by the probe on the biomolecules and cells resulting from thermal drift can damage or distort such biomolecules and cells.

Therefore, there is a need for a method and device that compensates for thermal drift in AFM, including reducing or eliminating the added amount of force exerted by the probe as a result of thermal drift.

SUMMARY OF THE INVENTION

The disadvantages of the prior art are overcome by the present invention which, in one aspect, is an atomic force microscopy system includes an imaging probe having a first thermal displacement constant and a sample placement surface. At least a portion of the sample placement surface has a second thermal displacement constant. The sample placement surface is spaced apart from the imaging probe at a predetermined displacement. The sample placement surface is configured so that the second thermal displacement constant matches the first thermal displacement constant so that when the imaging probe and the sample placement surface are subject to a predetermined temperature, both the portion of the sample placement surface and the imaging prove are displaced by a same distance.

In another aspect, the invention is a method of compensating for thermal drift of an imaging probe in and atomic force microscope, wherein the imaging probe is displaced at a first rate as a result to a change in temperature. In the method, a sample to be imaged is placed on a sample placement surface that is made of a material configured to be displaced at a second rate as a result in the change in temperature that corresponds to the first rate.

These and other aspects of the invention will become apparent from the following description of the preferred embodiments taken in conjunction with the following drawings. As would be obvious to one skilled in the art, many

DETAILED DESCRIPTION OF THE INVENTION

Figure 1:
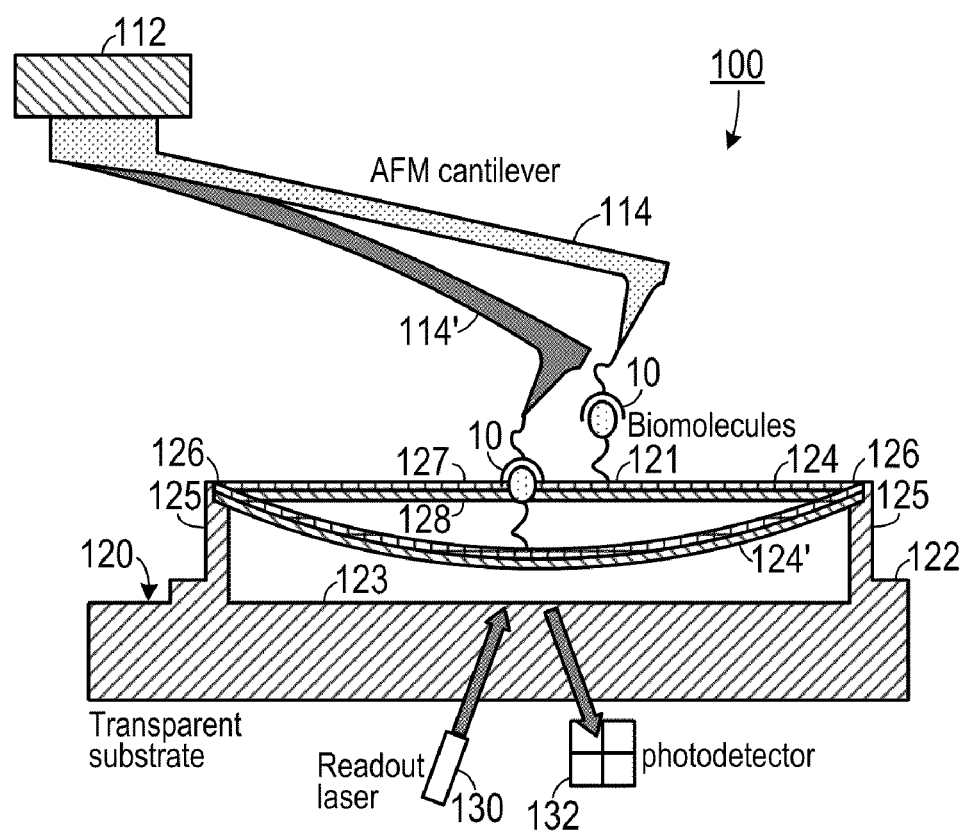
FIG. 1 is a schematic diagram of a first embodiment of an AFM system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One embodiment employs a system design such that ambient temperature fluctuations have no effect all the measurements made by the AFM cantilevers. The method introduced for athermalization of AFM cantilevers includes coupling them with thermo-mechanically matched microstructures.

As shown in FIG. 1, one embodiment is an atomic force microscopy system 100 that includes an imaging probe 114 having a first thermal displacement constant and a sample placement surface 121. At least a portion of the sample placement surface 121 has a second thermal displacement constant. The sample placement surface 121 is spaced apart from the imaging probe 114 at a predetermined displacement. The sample placement surface 121 is configured so that the second thermal displacement constant matches the first thermal displacement constant so that when the imaging probe 114 and the sample placement surface 121 are subject to a predetermined temperature, both the portion of the sample placement surface 121 and the imaging probe 114 are displaced by a same distance. In one embodiment, the sample placement surface includes a bimaterial structure 120. Thermal drift of an imaging probe in and atomic force microscope is compensated for by placing a sample 10 to be imaged on a sample placement surface 121 that is made of a material configured to be displaced at a second rate as a result in the change in temperature that corresponds to the first rate.

One embodiment of the bimaterial structure 120 includes a substrate 122 having a top surface 123, a membrane 124 and a support structure 125. The membrane 124 has a periphery 126 and includes a first layer 127 of a first material that expands at a first rate in relation to a change in temperature and a second layer 128 of a second material that expands at a second rate, different from the first rate, in relation to the change in temperature. The first layer 127 is coupled to the second layer 128. The support structure 125 is configured to support the periphery 126 of the membrane 124 at a fixed distance from the top surface 123. A readout laser 130 generates a beam that reflects off of the membrane 124 and the reflected beam is sensed by a photodetector 132.

A passive bimaterial membrane 124 is used as the matching microstructure designed such that it thermally deflects identically with the measurement cantilever imaging probe 114. This provides constant tip-to-membrane distance even under thermal fluctuations when a piezoelectronically actuated actuator 112 keeps the cantilever-lo-substrate distance constant. Thus, when the piezoelectronically actuated actuator 112 is ramped up and down for molecular force spectroscopy experiments, the peak force exerted on the biomolecules 10 stays the same. Maintaining the peak force at the set value is important to avoid pushing the biomolecules 10 with the probe tip too hard so that they would not be damaged and would become the secondary source of adhesive interaction. This embodiment allows an AFM user to maintain the set peak force without the need for an external driver or feedback. Note that the cantilever 114 still bends, and there is a shift in zero-force level set for the cantilever 114. This can be corrected by reading the displacement of the membrane 124. To make sure that the membrane displacement is only due to thermal fluctuations but not the biomolecular interaction forces, the membrane 124 should be much stiffer as compared to the cantilever 114.

In one embodiment, the bimaterial structure includes a cantilever and a support. The cantilever has a proximal end and a spaced apart distal end. The cantilever includes a first layer of a first material that expands at a first rate in relation to a change in temperature and a second layer of a second material that expands at a second rate, different from the first rate, in relation to the change in temperature, the first layer coupled to the second layer. The support structure is configured to support the proximal end of the cantilever at a fixed distance from the top surface.

Figure 2A:
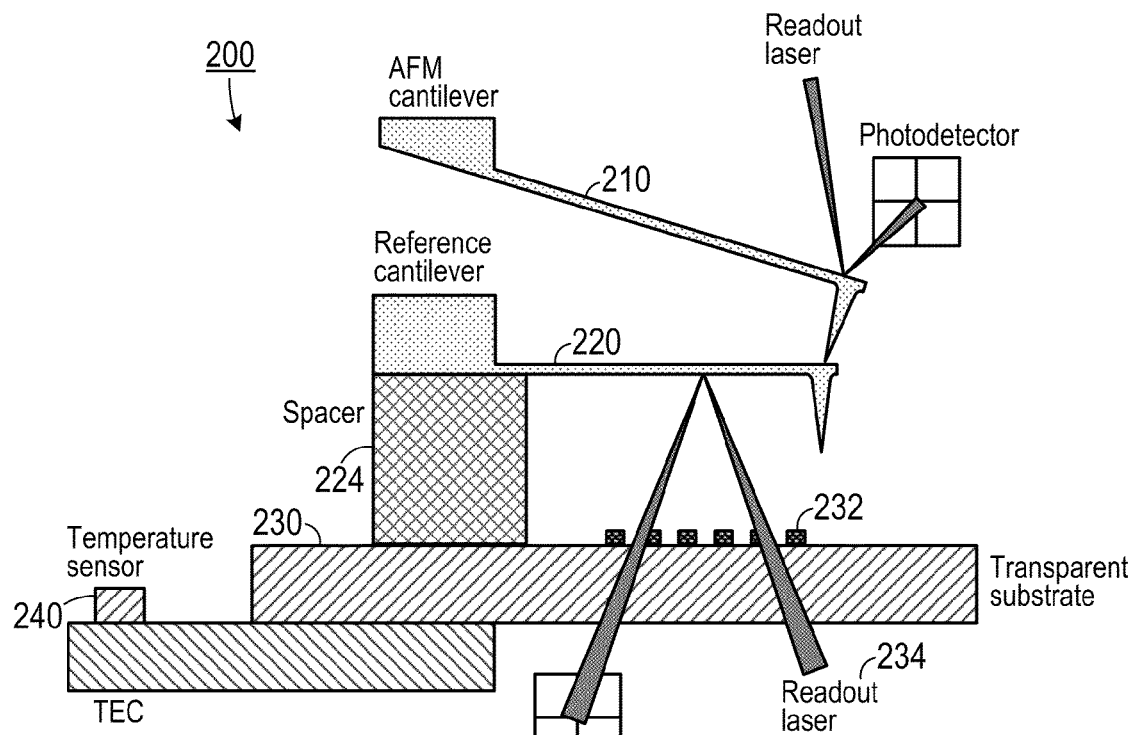
FIG. 2A is a schematic diagram of a second embodiment of an AFM system.
Figure 2B:
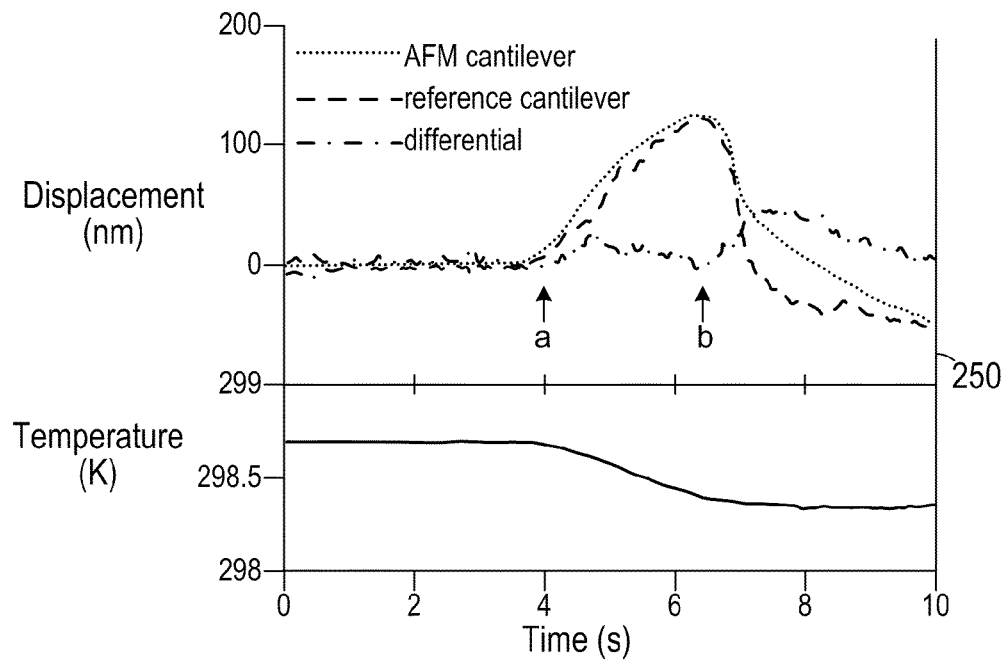
FIG. 2B is a graph showing displacement in relation to temperature of the AFM cantilever and the reference cantilever shown in FIG. 2A.

In one experimental embodiment, a 320 µm long, triangular-shaped cantilever made of silicon nitride, chromium and gold (such as a model MLCT-C, available from Veeco Probes) was chosen. Thermal deflection of the cantilever tip was measured to be 315 nm/° K. This figure matches the calculations using an analytical thermal deflection model for multilayer structures and verifies the model. In an embodiment shown in FIG. 2A, to test the concept of athermalization of AFM cantilevers by a matching microstructure, an AFM cantilever 210 in air was coupled with an identical cantilever 220 using the setup schematically shown in FIG. 2A. The reference cantilever 220 was coupled on a diffraction grating 232 using a 300 µm-thick spacer 224, and its displacement was read using the diffraction grating interferometer 234. To control the temperature of the cantilevers, the substrate 230 of the reference cantilever 220 was placed on a thermoelectric cooler (TEC). The temperature was monitored using a semiconductor temperature sensor 240 (LM135, available from National Semiconductor). As shown in FIG. 2B, the displacement traces of the cantilevers were recorded simultaneously together with the temperature data. The system was thermally excited shortly by running current through TEC from point a to b, labeled with small arrows. The temperature change was 0.4° K and both cantilevers deflected by 128 nm, which was expected from analytical calculations. The forced thermal responses of the cantilevers (from point a to b) were nearly identical and the differential displacement signal showed significant reduction in thermal deflection. However, the natural responses of the cantilevers (from point b to the end) were different because the thermal time constants of the cantilevers were different due to the mounting differences. This reduced the thermal deflection cancellation capability to some extent, but the differential signal still exhibited at least 3-times smaller change when compared with the change on AFM signal.

Figure 3A:
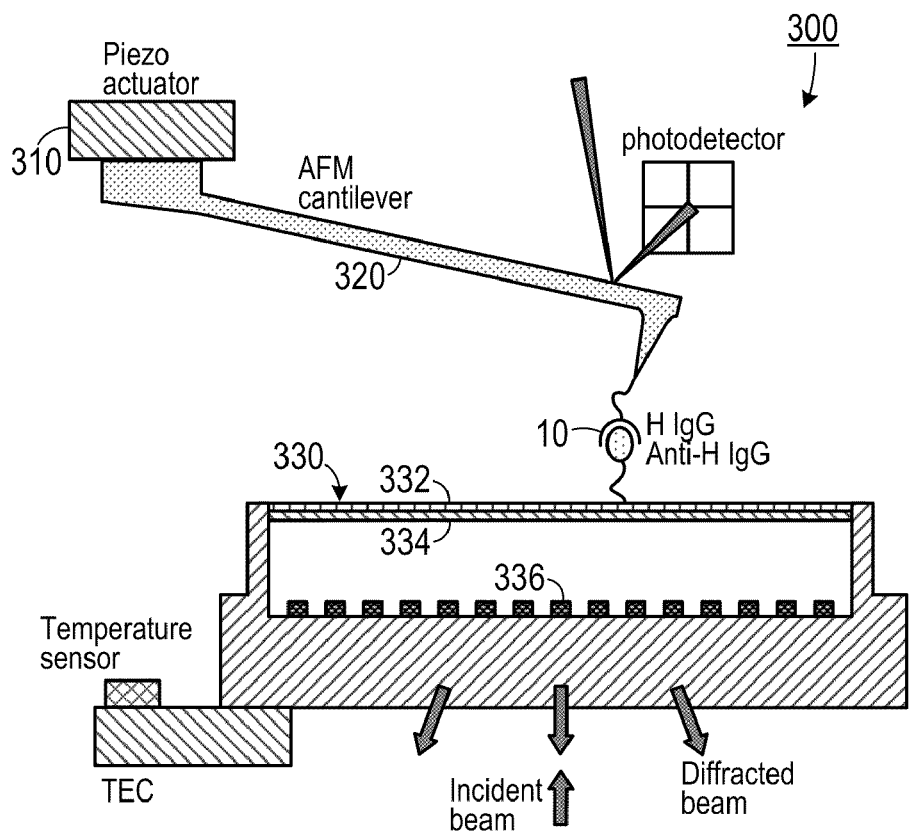
FIG. 3A is a schematic diagram of a third embodiment of an AFM system.

For biomolecular experiments in fluid, coupling two cantilevers may not be feasible without optimizing the interferometer for the reference cantilever such that it works well in fluid. Instead, the cantilever 320 was coupled with a bimaterial circular membrane 330 as schematically shown in FIG. 3A. The membrane chosen for this experiment was made of 1.5 μm-thick silicon nitride 332 and 0.2 μm thick gold.

The expected thermal deflection at the center of the 500 μm diameter membrane 330 was calculated to be 119 nm/° K using an analytical model where the radius of curvature (1/R) for a temperature change of ΔT is expressed as:

$$1/R = \frac{6}{h_1 + h_2} \cdot \frac{(\alpha_2 - \alpha_1)\Delta T(1 + h_1/h_2)^2}{3(1 + h_1/h_2)^2 + [1 + (h_1/h_2)(D_1/D_2)](h_1/h_2)^2 + \frac{1}{(h_1/h_2)(D_1/D_2)}}$$

where h, α, D are the thickness, coefficient of thermal expansion, and plate rigidity of the layers and the subscripts differentiate the layers.

Figure 3B:
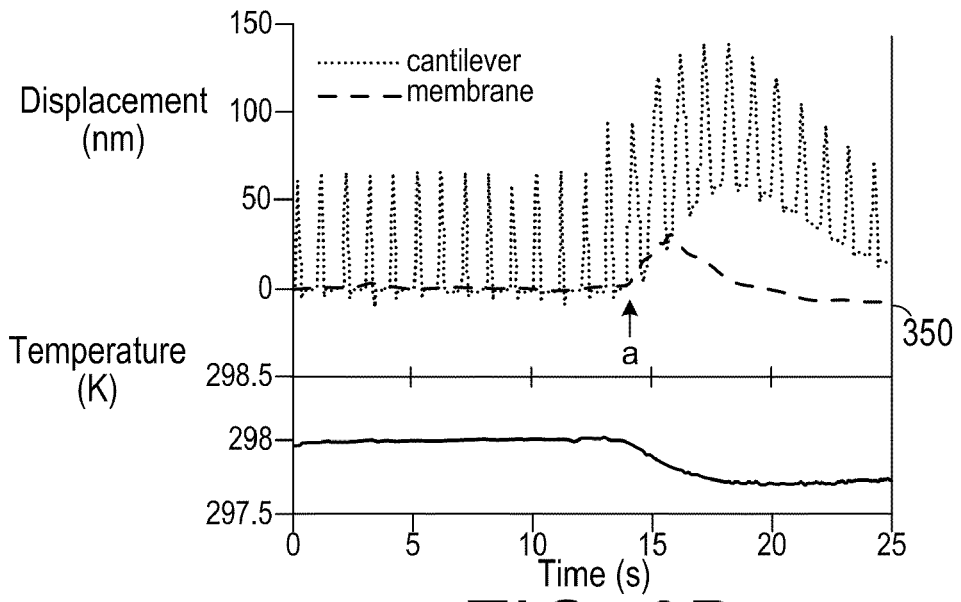
FIG. 3B is a graph showing displacement in relation to temperature of the AFM cantilever and the sample placement surface membrane shown in FIG. 3A.

A force spectroscopy experiment was carried out with the membrane incubated with 10-20 μl of anti-human IgG, and the AFM cantilever incubated with 10 μl of human IgO (10 μg/ml) for 15-20 minutes at room temperature. Using a piezo actuator 310, the cantilever 320 was brought in and out of contact with the membrane 330 and the displacement of the structures was recorded simultaneously as shown in FIG. 3B. Short thermal excitation by 0.3° K was introduced at point a labeled with a small arrow. The peak deflection of the cantilever 330 was 60 nm. This was measured when the structures were out of contact, which corresponds to the shift in zero-force level of the cantilever 320. The membrane, on the other hand, deflected 30 nm. The measured deflection at the center of the membrane was in good agreement with the analytical deflection analytical model shown above.

The shift in zero-force level was reduced with a differential signal using the recorded membrane displacement as a reference, but the complete cancellation of thermal drift requires a membrane that exhibits the same deflection with the cantilever. The delay seen in deflection curves of the structures can be explained with the differences between thermal time constants of the structures. Note that the introduced thermal disturbance was abrupt. Consequently, the responses of the structures were dominated by their time constants. However, the change in temperature in a typical force spectroscopy experiment is very slow and a well designed membrane could match both the thermal deflection and the time constant of the cantilever.

The second effect of thermal disturbance was the change in the peak force. This was reduced when the cantilever was coupled with the bimaterial membrane since both structures deflected in the same direction. Again, complete cancellation may require a perfectly matching membrane. Note that the membrane used was 3000 times stiffer than the cantilever. This ensured the membrane displacement due to the biomolecular interactions was insignificant.

Figure 4A:
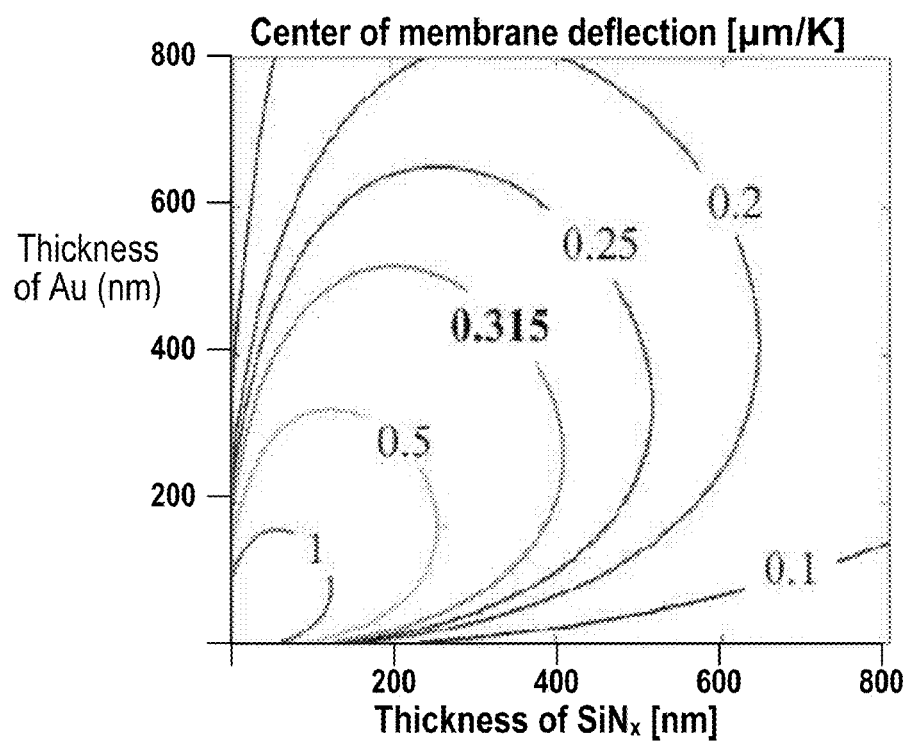
FIG. 4A is a graph showing thickness of gold in relation to $SiN_x$ in a membrane system.
Figure 4B:
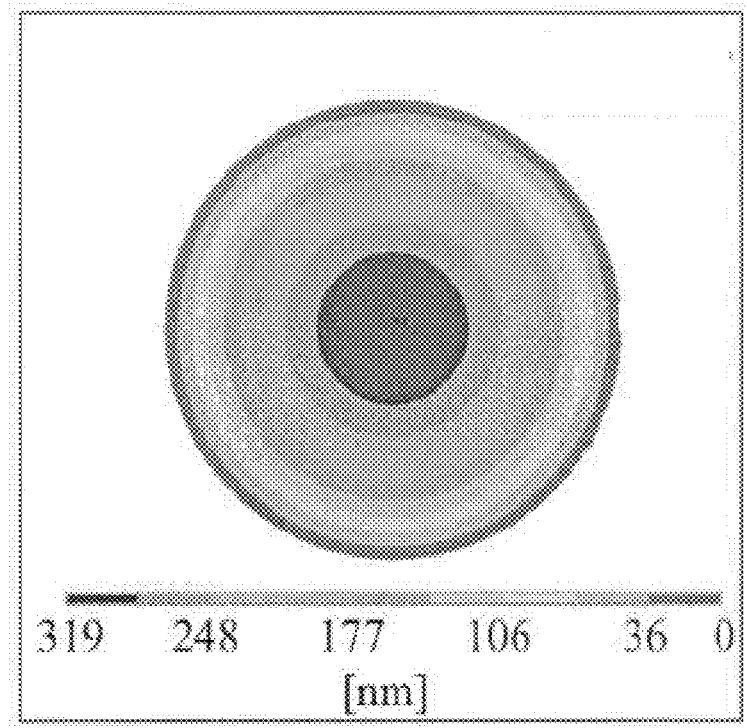
FIG. 4B is a schematic diagram showing material thicknesses of a sample placement surface membrane.

Based on the experimental data obtained using the available membrane, an ideal membrane for this particular cantilever is designed for this particular cantilever. The layer thicknesses are determined to match the thermal time constants of the structures. For immersed structures, thermal paths from the structure areas to the fluid will have higher conductivity. Based on this assumption, thermal time constant of the selected cantilever is equal to 1.71 β s., where β is the ratio of the effective thermal path length to the thermal conductivity of the fluid. A membrane with 270 nm-thick gold and 400 nm-thick silicon nitride is designed to match this figure using water as working fluid. If the radius of this membrane is set to 150 μm (the design space for thermal deflection is given in FIG. 4A), the analytical model of the equation shown above predicts that the membrane center deflects by 320 nm/° K. Thus it matches the thermal deflection of the selected cantilever. This figure was verified with the finite element simulation (FEM) using ANSYS software as shown in FIG. 4B. Moreover, FIG. 4B shows the possibility of using this membrane with different cantilevers by coupling them at different locations on the constant displacement contours on the membrane to match their thermal displacements. Note that this membrane is 300 times stiffer than the selected cantilever, and hence the membrane deflection due 10 biomolecular interactions will still be insignificant.

Different microstructures may be used for athermalization in AFM with imaging applications. For imaging, it is important to match thermo-mechanically an entire area rather than a single point. Thick micro-plates anchored with bimorph legs can provide this capability.

In addition to using membrane probes as thermo-mechanically matched structures for AFM cantilevers, it is also possible to design athermal membranes that can be used for force sensing. It is important to design an athermal membrane such that the center part of it, where the detection takes place, does not deflect due to temperature fluctuations. The non-uniform membrane structure introduced earlier is suitable for the realization of athermal membranes because of the discontinuous fashion of the top electrode. Unlike simple biomaterial membranes, this type of metal/dielectric combination can be designed such that the center of the membrane deflects upwards or downwards depending on the layer thicknesses. Moreover, it is possible to alter the thermo-mechanical behavior of the membrane by just varying the thickness of the top parylene layer. Note that the top parylene layer serves as a protection layer in fluid operation for the top electrode. Thus, changing the thickness of this layer does not alter the detection capabilities.

Figure 5A:
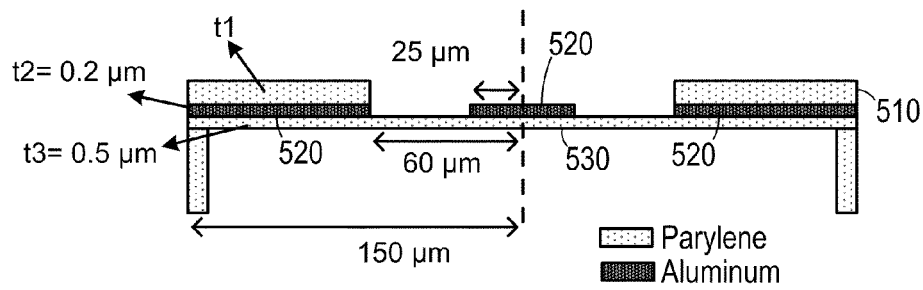
FIG. 5A is a schematic diagram of a parylene and aluminum membrane sample placement surface.
Figure 5B:
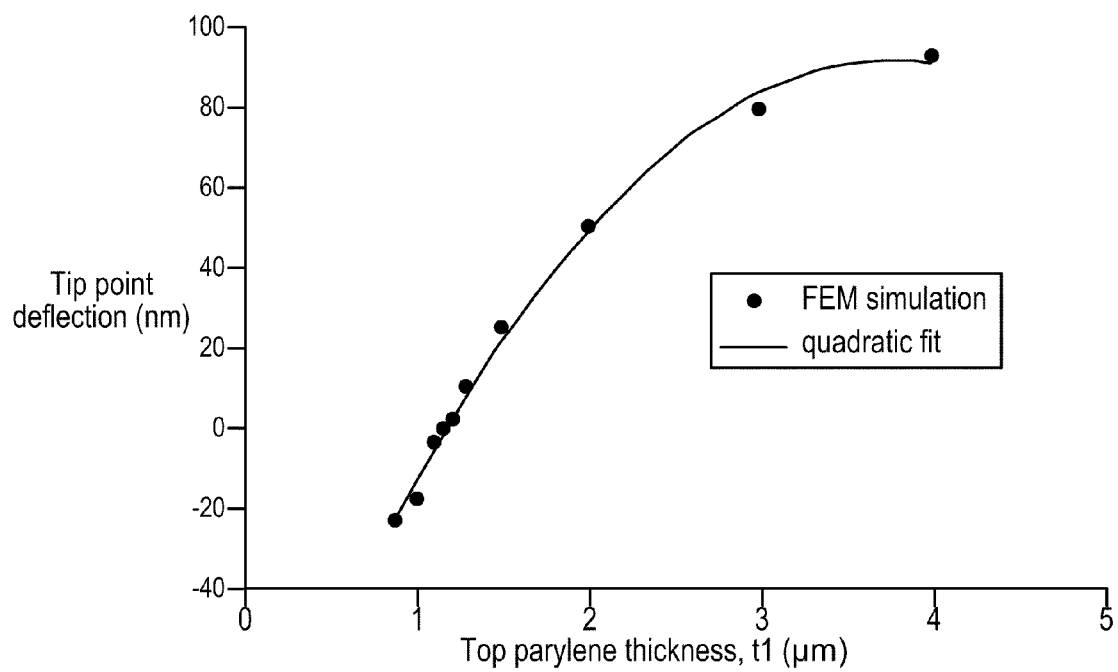
FIG. 5B is a graph relating tip point deflection to top parylene thickness in the embodiment shown in FIG. 5A.

A cross section of a circular probe made of parylene and aluminum based on the previously introduced structure is shown in FIG. 5A. The lateral dimensions are fixed based on the results obtained with this probe structure. The thickness of the bottom parylene layer 530 is limited to 0.5 μm to keep the stiffness of the detection membrane small. The thickness of the aluminum top electrode 520 is fixed to 0.2 μm that can be deposited conformally without increasing the stiffness excessively. The thickness of top parylene layer 510, denoted by $t_1$, is set as a variable. The results of FEM simulations that predict the displacement of membrane center as a function of $t_1$ when the structure is exposed to +1° C. temperature difference are shown in FIG. 5B.

Figure 6:
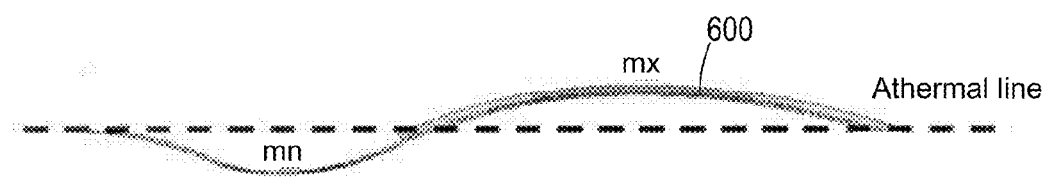
FIG. 6 is a graph showing a simulation of a thermal line.

The center of membrane deflects upwards when the membrane is heated up for $t_1 > 1.15$ μm, and downwards for $t_1 < 1.15$ μm. At ($t_1 = 1.15$ μm, the membrane center does not deflect thermally, pointing to an athermal design. The profile 600 of this athermal membrane is shown in FIG. 6. During the fabrication processes, it is possible to control the lateral dimensions within 10%. However control on vertical dimension is more difficult. Thus, the parylene layer thickness can vary even if it is nominally set to 1.15 μm. The effect of thickness variation on the tip point deflection of the membrane can be observed using the simulation results. The quadratic fit given in FIG. 5B agrees well with the FEM simulations and the slope of the fit can be used to observe the sensitivity of tip point deflection to thickness variations. The slope of the curve at t=1.15 μm is rather large, but note that the tip deflection varies within ±20 nm/° K for 20% variation in parylene layer thickness. This figure is superior comparing with that of the cantilever presented here (315 nm/° K).

Figure 7A:
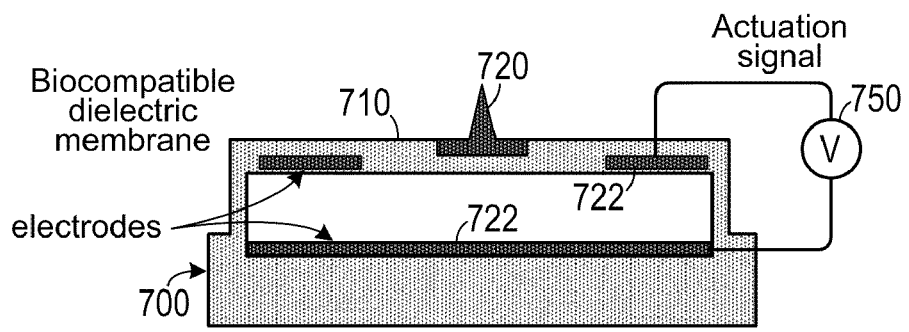
FIGS. 7A-7C are schematic diagrams showing three different actuating systems employed in membrane-based embodiments.
Figure 7B:
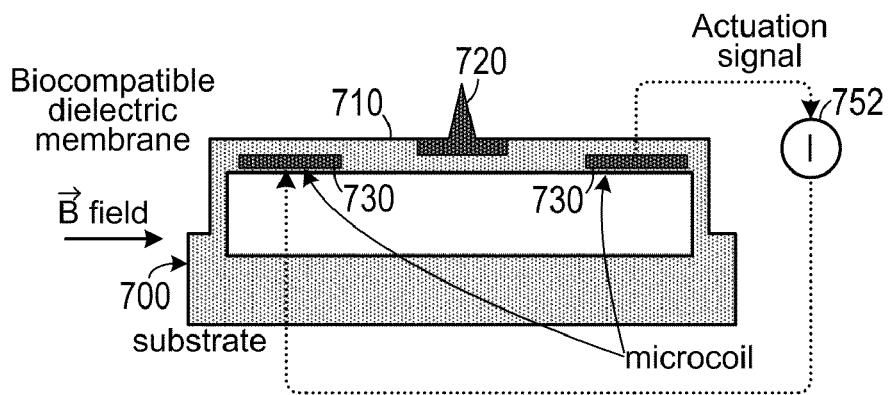
Figure 7C:
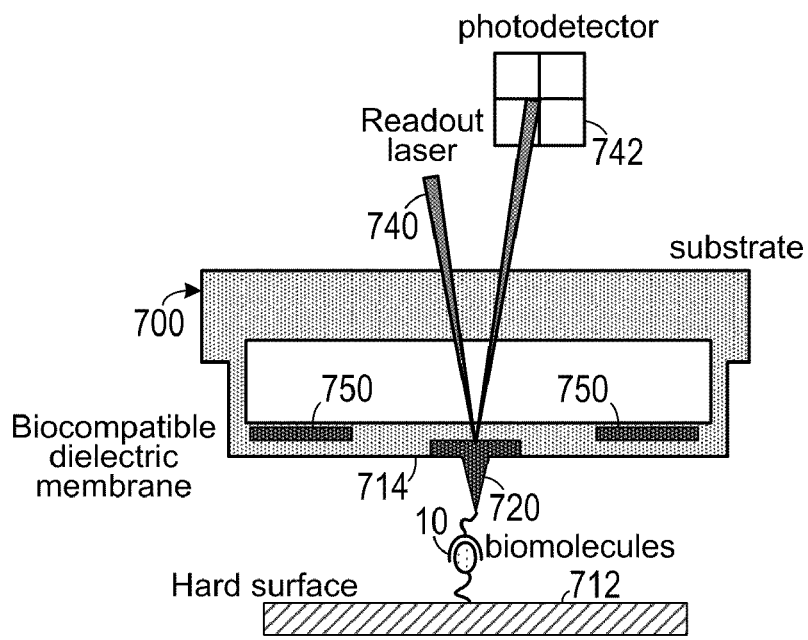

Athermal membrane probes 700 presented here can be used for long time-scale biophysical experiments as schematically shown in FIGS. 7A-7C. Growing a tip 720 on top of the membrane 710 eliminates the need for a cantilever. The membrane 710 can be actuated electrostatically by employing spaced apart electrodes 722, as explained before and as shown in FIG. 7A, or electromagnetically as shown in FIG. 7B. Electromagnetic actuation requires passing current in a micro-coil 730 embedded in the membrane 710 and exposing the membrane to a magnetic field (B-field). Comparing with the electrostatic actuation, electromagnetic actuation method offers several advantages. Unlike electrostatic actuation, electromagnetic actuation provides linear, bi-directional membrane movement. It requires significantly lower voltage values for operation. Moreover, pull-in phenomena observed with electrostatic actuators do not affect electromagnetic actuators. On the other hand, passing current through membrane induces joule heating that introduces thermal fluctuations in operation. This drawback, however, can be tolerated with athermal membrane design. Even if the membrane heats up due to joule heating, the membrane center does not move significantly, making this method feasible. In the embodiment shown in FIG. 7C, biomolecules 10 disposed on a hard surface 712 may be sensed by a probe 720 on a biocompatible dielectric membrane 714 with embedded actuators 750. Position of the probe is sensed by a reflected beam from a readout laser 740 detected by a photodetector 742.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An atomic force microscopy system, comprising:
    a. an imaging probe having a first thermal displacement constant; and
    b. a sample placement surface, at least a portion of which having a second thermal displacement constant, that is spaced apart from the imaging probe at a predetermined displacement, the sample placement surface configured so that the second thermal displacement constant matches the first thermal displacement constant so that when the imaging probe and the sample placement surface are subject to a predetermined temperature, both the portion of the sample placement surface and the imaging prove are displaced by a same distance.

2. The atomic force microscopy system of claim 1, wherein the sample placement surface comprises a bimaterial structure.

3. The atomic force microscopy system of claim 2, wherein the bimaterial structure comprises:
    a. a substrate having a top surface;
    b. a membrane, having a periphery, that includes a first layer of a first material that expands at a first rate in relation to a change in temperature and a second layer of a second material that expands at a second rate, different from the first rate, in relation to the change in temperature, the first layer coupled to the second layer; and
    c. a support structure configured to support the periphery of the membrane at a fixed distance from the top surface.

4. The atomic force microscopy system of claim 2, wherein the bimaterial structure comprises:
    a. a cantilever, having a proximal end and a spaced apart distal end, that includes a first layer of a first material that expands at a first rate in relation to a change in temperature and a second layer of a second material that expands at a second rate, different from the first rate, in relation to the change in temperature, the first layer coupled to the second layer; and
    b. a support structure configured to support the proximal end of the cantilever at a fixed distance from the top surface.

5. A method of compensating for thermal drift of an imaging probe in and atomic force microscope, wherein the imaging probe is displaced at a first rate as a result to a change in temperature, comprising the action of placing a sample to be imaged on a sample placement surface that is made of a material configured to be displaced at a second rate as a result in the change in temperature that corresponds to the first rate.

6. A method of imaging a sample with an atomic force microscope having a probe that is displaced in an amount that is a function of temperature, the method comprising the steps of:
    a. placing the sample on a surface that is displaced in an amount that is a function of temperature by an amount corresponding to the amount that the probe is displaced as a function of temperature; and
    b. engaging the probe with the sample.

7. The method of claim 6, wherein the surface comprises a bimetallic structure.

8. The method of claim 7, wherein the bimetallic structure comprises a membrane.

9. The method of claim 7, wherein the bimetallic structure comprises a reference cantilever.

10. The method of claim 6, wherein the surface comprises:
    a. a first layer of a first material that expands at a first rate in relation to a change in temperature; and
    b. a second layer of a second material that expands at a second rate, different from the first rate.

* * * * *